US008797758B2

(12) United States Patent
Iyatani

(10) Patent No.: US 8,797,758 B2

(45) Date of Patent: Aug. 5, 2014

(54) ELECTRICAL CONNECTION STRUCTURE OF ELECTRONIC BOARD

(75) Inventor: Masatoshi Iyatani, Nagano (JP)

(73) Assignee: Nissan Kogyo Co., Ltd., Nagano (JP)

( * ) Notice: Subject to any disclaimer, the term of this patent is extended or adjusted under 35 U.S.C. 154(b) by 36 days.

(21) Appl. No.: 13/045,007

(22) Filed: Mar. 10, 2011

(65) Prior Publication Data

US 2011/0222254 A1 Sep. 15, 2011

(30) Foreign Application Priority Data

Mar. 12, 2010 (JP) ............................... P2010-055358

(51) Int. Cl.
*H05K 7/02* (2006.01)

(52) U.S. Cl.
USPC ............................ 361/775; 361/772; 439/736

(58) Field of Classification Search
USPC .................................. 439/736; 361/775, 772
See application file for complete search history.

(56) References Cited

U.S. PATENT DOCUMENTS

| | | | | |
|---|---|---|---|---|
| 5,772,474 A * | 6/1998 | Yagi et al. | 439/660 |
| 7,110,246 B2 * | 9/2006 | Tsunooka et al. | 361/637 |
| 7,255,610 B2 * | 8/2007 | Oohashi et al. | 439/736 |
| 7,705,443 B2 * | 4/2010 | Yokomae et al. | 257/690 |
| 2008/0150102 A1 | 6/2008 | Yokomae et al. | |

FOREIGN PATENT DOCUMENTS

| | | |
|---|---|---|
| CN | 1150341 A | 5/1997 |
| CN | 1824484 A | 8/2006 |
| JP | 279072 | 6/1990 |
| JP | 553149 | 7/1993 |
| JP | 09-107059 | 4/1997 |
| JP | 2003-333731 | 11/2003 |

OTHER PUBLICATIONS

Japanese Patent Office Action for Appl. No. 2010-055358, dated Jan. 24, 2012.

Office Action for related Application No. 201110057350.8 dated Nov. 13, 2013, 14 pages.

* cited by examiner

*Primary Examiner* — Jayprakash N Gandhi
*Assistant Examiner* — Mukund G Patel
(74) *Attorney, Agent, or Firm* — Andrew M. Calderon; Roberts Mlotkowski Safran & Cole, P.C.

(57) ABSTRACT

An electrical connection structure of an electronic board includes: a board support member formed of synthetic resin; an electronic board fixed to the board support member; an electrical connection pad disposed on the electronic board; a bus bar disposed in the board support member; and a bonding wire that electrically connects the electrical connection pad and the bus bar. The bus bar includes: an exposed portion exposed in a face of the board support member; an embedded portion embedded in the board support member; and a connection portion extending from the exposed portion and being electrically connected to an electrical component. An end of the bonding wire is bonded to the exposed portion, and a first cut portion is formed in the embedded portion.

18 Claims, 6 Drawing Sheets

10
50
20
30
40
V
V
V
V
V
101
140
151
152
U
103
100
152
151
S
R
R
153
155
105
200
220
210
P

ELECTRICAL CONNECTION STRUCTURE OF ELECTRONIC BOARD

CROSS REFERENCE TO RELATED APPLICATION(S)

The present disclosure relates to the subject matters contained in Japanese Patent Application No. 2010-055358 filed on Mar. 12, 2010, which are incorporated herein by reference in its entirety.

BACKGROUND

1. Field

The present invention relates to an electrical connection structure of an electronic board fixed to a board support member and a bus bar disposed in the board support member.

2. Description of the Related Art

For example, an electronic control unit used in a hydraulic brake system for a vehicle includes a control board controlling electrical components such as electromagnetic valves and pressure sensors mounted on a base body having a brake fluid path formed therein or an electrically-driven component such as a motor and a housing receiving the control board.

The housing is a box-shaped member fixed to one face of the base body and has an internal space receiving electrical components protruding from one face of the control board or the base body.

A part of a bus bar is exposed from the inner face of the housing. The exposed face of the bus bar is electrically connected to an electrical connection pad disposed in an electrical circuit on the control board by a bonding wire.

As such a bus bar, a bus bar is known in which the backside of the exposed portion of the bus bar is embedded in the inner face of the housing at the time of insert-molding the bus bar into the housing, thereby stably fixing the bus bar to the housing (see JP-A-2003-333731, for instance).

As described above, in the configuration in which the exposed portion of the bus bar is embedded in the inner face of the housing, the bus bar can be stabilized in the width direction (a direction perpendicular to the longitudinal direction of the bus bar) but there is a problem in that the adhesive property of the bus bar to the housing, particularly, the adhesive property in the longitudinal direction of the bus bar is low.

SUMMARY

One of objects of the invention is to provide an electrical connection structure which can enhance the adhesive property of a bus bar to a board support member and enhance the connection reliability between an electronic board and the bus bar.

In order to achieve the above-mentioned object, according to an aspect of the invention, there is provided an electrical connection structure of an electronic board including: a board support member formed of synthetic resin; an electronic board fixed to the board support member; an electrical connection pad disposed on the electronic board; a bus bar disposed in the board support member; and a bonding wire that electrically connects the electrical connection pad and the bus bar, wherein the bus bar includes: an exposed portion exposed in a face of the board support member; an embedded portion embedded in the board support member; and a connection portion extending from the exposed portion and being electrically connected to an electrical component, wherein an end of the bonding wire is bonded to the exposed portion, and wherein a first cut portion is formed in the embedded portion.

When the board support member includes a mounting portion to which the electronic board is mounted and a peripheral wall portion surrounding the mounting portion, the embedded portion of the bus bar may be embedded in the peripheral wall portion.

According to this configuration, when the bus bar is insert-molded into the board support member, the synthetic resin flows in the cut portion formed in the embedded portion of the bus bar and the synthetic resin cured in the cut portion serves as a wedge. Accordingly, according to the invention, it is possible to easily enhance the adhesive property of the bus bar to the board support member and thus to enhance the connection reliability between the electronic board and the bus bar.

When an end of the bonding wire is vibration-welded to the exposed portion of the bus bar, the end of the bonding wire is typically made to vibrate in the longitudinal direction of the exposed portion. In this case, the vibration in the longitudinal direction is applied to the exposed portion of the bus bar. Accordingly, by forming the embedded portion at an end in the longitudinal direction of the exposed portion of the bus bar, forming the cut portion in a side edge portion of the embedded portion, and indenting the embedded portion in a direction perpendicular to the longitudinal direction of the exposed portion, it is preferable to enhance the adhesive property of the bus bar in the longitudinal direction of the exposed portion, that is, in the vibration direction of the bonding wire.

The cut portion may be formed in at least one of a front side and a back side of the embedded portion. A first cut portion may be formed in a first position in a front side of the embedded portion and a second cut portion may be formed in a second position in a back side of the embedded portion, and the first position may be shifted from the second position in a longitudinal direction of the embedded portion. Accordingly, it is possible to enhance the adhesive property of the bus bar to the board support member.

In the invention, the bus bar is accurately positioned by embedding the end of the bus bar in the board support member. Accordingly, in the configuration in which a plurality of bus bars are formed in parallel in the board support member, it is possible to reduce the distance between the bus bars, thereby reducing the size of the board support member.

In the electrical connection structure of an electronic board according to the invention, by causing the synthetic resin to flow in the cut portion formed in the embedded portion of the bus bar, it is possible to easily enhance the adhesive property of the bus bar to the board support member and thus to enhance the connection reliability between the electronic board and the bus bar.

BRIEF DESCRIPTION OF THE DRAWINGS

A general configuration that implements the various features of the invention will be described with reference to the drawings. The drawings and the associated descriptions are provided to illustrate embodiments of the invention and not to limit the scope of the invention.

FIGS. 4A and 4B are diagrams illustrating an electrical connection structure according to the embodiment of the invention, wherein FIG. 4A is a perspective view of a bus bar and FIG. 4B is a side sectional view of the electrical connection structure.

FIGS. 5A to 5C are diagrams illustrating bus bars according to another embodiment of the invention, wherein FIG. 5A is a perspective view illustrating an example where a cut portion is formed on the front face of an embedded portion, FIG. 5B is a perspective view illustrating an example where cut portions are formed on both faces of the embedded portion, and FIG. 5C is a side sectional view illustrating the example where the cut portions are formed on both faces of the embedded portion.

FIGS. 6A and 6B are diagrams illustrating bus bars according to another embodiment of the invention, wherein FIG. 6A is a perspective view illustrating an example where cut portions having a semi-circular shape are formed and FIG. 6B is a perspective view illustrating an example where cut portions having a rectangular shape are formed.

DETAILED DESCRIPTION OF THE EMBODIMENT(S)

Embodiments of the invention will be described in detail with reference to the accompanying drawings.

In the embodiments of the invention, an electrical connection structure of a control board (corresponding to the "electronic board" in the claims) in an electronic control unit of a brake fluid pressure control device for a vehicle is exemplified.

Figure 1:
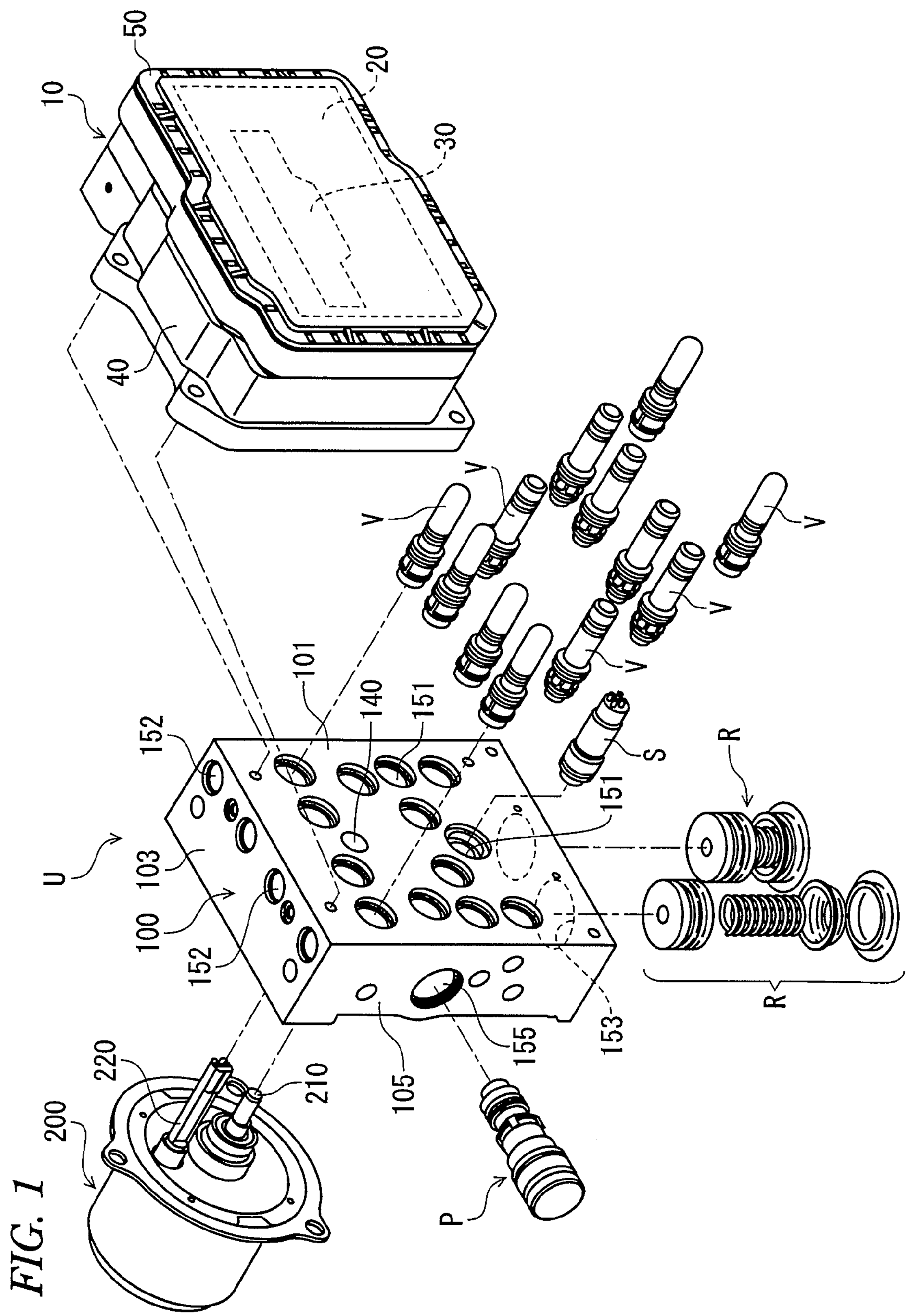
FIG. 1 is an exploded perspective view illustrating a brake fluid pressure control device for a vehicle according to an embodiment of the invention.

A brake fluid pressure control device for a vehicle U controls a brake fluid pressure acting on a wheel cylinder. As shown in FIG. 1, the brake fluid pressure control device for a vehicle U mainly includes a base body 100 to which electrical components such as electromagnetic valves V or pressure sensors S, an electrically-driven component such as a motor 200, and a plunger pump P are assembled, and an electronic control unit 10 having a control board 20 controlling the operations of the electromagnetic valves V or the motor 200.

A brake fluid path connecting a master cylinder to the wheel cylinder is formed in the base body 100. The control board 20 actuates the electromagnetic valves V and the motor 200 based on a behavior of the vehicle so as to change a brake fluid pressure within the brake fluid path.

The base body 100 is a metal component having a substantially rectangular parallelepiped shape and having the brake fluid path formed therein. Mounting holes 151 into which electrical components such as the electromagnetic valves V or the pressure sensor S are mounted are formed in the front face 101 among the faces of the base body 100.

Output ports 152 connected to brake pipes extending to the wheel cylinder are formed in the top face 103 of the base body 100.

Reservoir holes 153 into which reservoir components R of a reservoir are mounted are formed in the bottom face of the base body 100.

A pump hole 155 into which a plunger pump P is mounted is formed in the side face 105 of the base body 100.

The holes formed in the base body 100 communicate with each other directly or via brake fluid paths formed in the base body 100.

Figure 2:
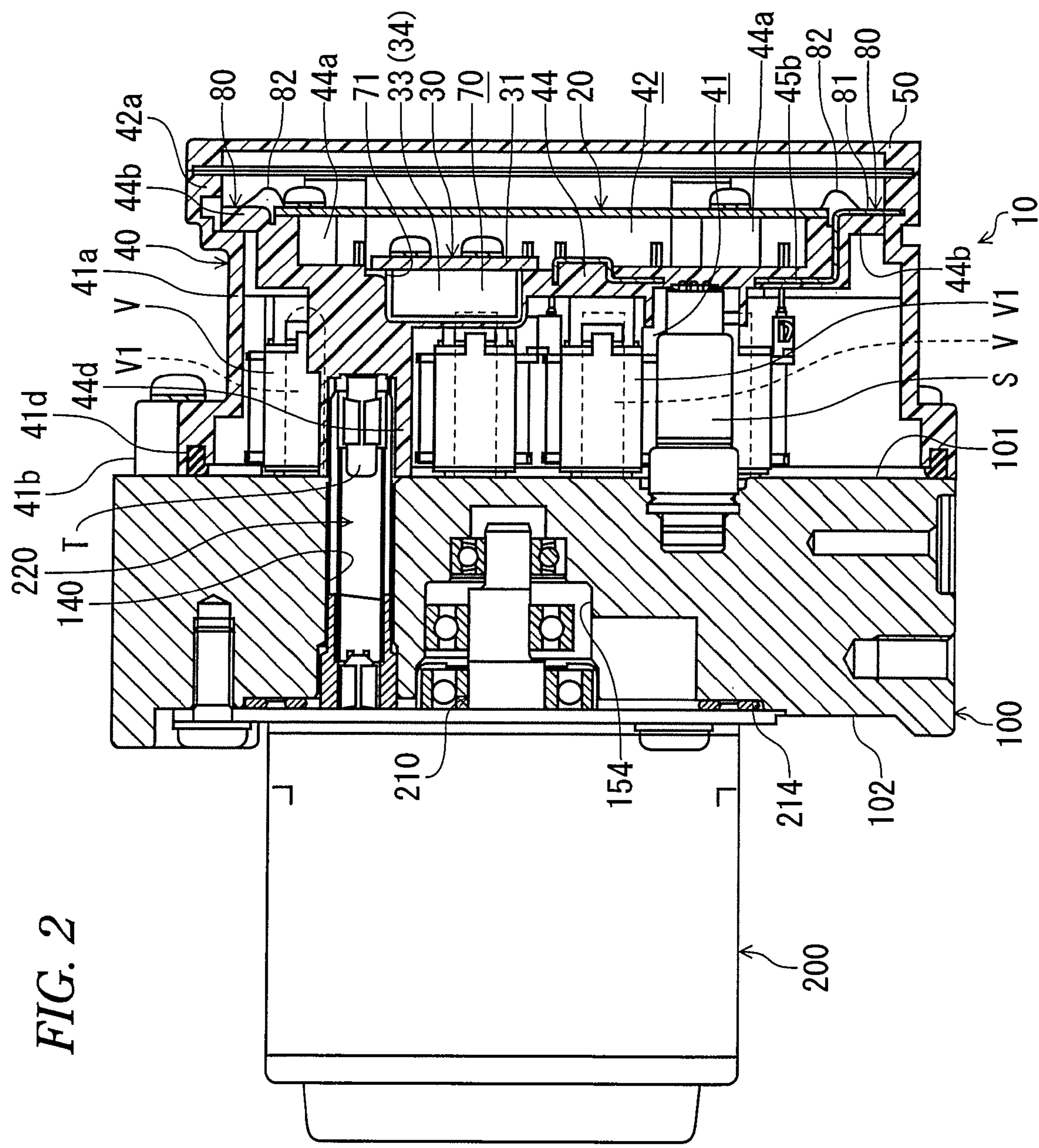
FIG. 2 is a side perspective view illustrating the brake fluid pressure control device for a vehicle according to the embodiment of the invention.

The motor 200 is a power source of the plunger pump P and is fixed to the back face 102 of the base body 100 as shown in FIG. 2. The output shaft 210 of the motor is inserted into a motor mounting hole 154 of the base body 100. A motor bus bar 220 supplying power to the motor 200 is inserted through a terminal hole 140 of the base body 100 and is connected to the electronic circuit of the control board 20 via terminals T disposed in a housing 40.

As shown in FIG. 1, the electronic control unit 10 includes a control board 20 controlling the operation of the electromagnetic valve V and the motor 200, a sensor board 30 detecting the behavior of the vehicle, and the housing 40 (corresponding to the "board support member" in the claims) receiving the control board 20 and the sensor board 30.

As shown in FIG. 2, the housing 40 is a box-shaped member formed of synthetic resin and fixed to the front face 101 of the base body 100 in a state where the housing 40 covers the electrical components such as the electromagnetic valves V and the pressure sensor S protruding from the front face 101 of the base body 100.

In the housing 40, the face (the right side face in FIG. 2) apart from the base body 100 and the face (the left side face in FIG. 2) facing the base body 100 are opened. A first reception chamber 41 receiving the electrical components such as electromagnetic valves V, electromagnetic coils V1, and a pressure sensor S is formed on the back side of the inner space of the housing 40. A second reception chamber 42 receiving the sensor board 30 and the control board 20 is formed on the front side of the inner space thereof. The opening of the housing 40 opposite to the base body 100 is hermetically closed with a cover 50 formed of synthetic resin.

The housing 40 includes a substantially rectangular partitioning portion 44 (corresponding to the "mounting portion" in the claims) on which the control board 20 is mounted in a layered structure and peripheral wall portions 41*a* and 42*a* rising upright from the front side and the back side of the peripheral edge of the partitioning portion 44 and surrounding the partitioning portion 44. The inside of the housing 40 is partitioned into the front side and the back side by the partitioning portion 44, whereby the first reception chamber 41 and the second reception chamber 42 are formed. The peripheral wall portions 41*a* and 42*a* include a first peripheral wall portion 41*a* forming the first reception chamber 41 and a second peripheral wall portion 42*a* forming the second reception chamber 42. The outer shapes of the first peripheral wall portion 41*a* and the second peripheral wall portion 42*a* are substantially rectangular (see FIG. 3).

The first peripheral wall portion 41*a* is a part surrounding the electrical components protruding from the front face 101 of the base body 100 and includes a flange 41*b* contacting the outer peripheral edge of the front face 101 of the base body 100. Mounting holes 41*c* are formed at proper positions of the flange 41*b* (see FIG. 3). An endless seal member 41*d* is mounted to the end of the flange 41*b* facing the base body 100 along the inner circumference of the flange 41*b*. The seal member 41*d* is a member coming in close contact with the front face 101 of the base body 100 to seal the space between the base body 100 and the housing 40.

The second peripheral wall portion 42*a* is a portion surrounding the sensor board 30 and the control board 20 and is disposed on the front side of the first peripheral wall portion 41*a*.

The partitioning portion is a plate-like portion opposed to the front face 101 of the base body 100 with a gap therebetween. Board supports 44*a* supporting the control board 20 protrude from four corners of the face facing the second reception chamber 42 (see FIG. 3). The protruding ends of the board supports 44*a* come in contact with the back face of the control board 20 and screw holes are formed at the protruding ends.

A terminal mounting portion 44*d* through which a terminal T passes is formed in the partitioning portion 44. An end of the terminal T protrudes into the first reception chamber 41 and the other end protrudes into the second reception chamber 42.

Figure 3:
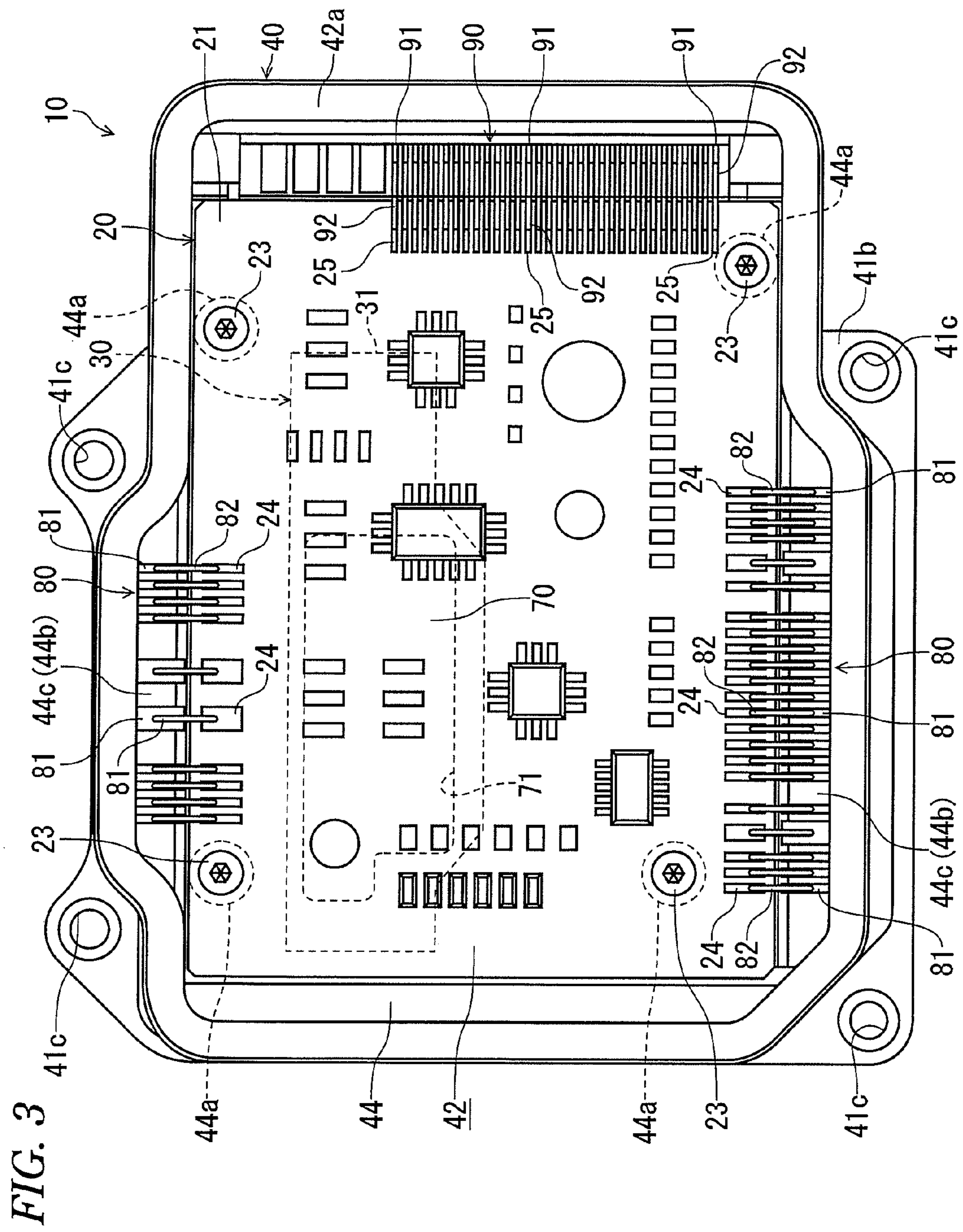
FIG. 3 is a diagram illustrating the inside of the housing according to the embodiment of the invention as viewed from the outside.

In the vicinity of the center of the face of the partitioning portion 44 facing the second reception chamber 42, a concave portion 71 is formed at a position adjacent to the terminal mounting portion 44*d* so as to protrude into the first reception chamber 41 (see FIG. 3). The inner space of the concave portion 71 serves as a sensor receiving portion 70 communicating with the second reception chamber 42.

In the sensor board 30, electronic components such as an angular velocity sensor 33 and an acceleration sensor 34 detecting the behavior of the vehicle are mounted on a board body 31 on which an electronic circuit (not shown) is printed.

In a state where the face of the sensor board 30 mounted with the angular velocity sensor 33 and the acceleration sensor 34 is directed to the partitioning portion 44, the board body 31 is mounted to the face of the partitioning portion 44 facing the second reception chamber 42 with bolts and the angular velocity sensor 33 and the acceleration sensor 34 are received in the sensor receiving portion 70.

In the control board 20, electronic components such as semiconductor chips are mounted on a rectangular board body 21 on which an electronic circuit (not shown) is printed (see FIG. 3). The control board 20 controls the operation of the electromagnetic valves V and the motor 200 based on information acquired from the sensor board 30 and/or various sensors such as a pressure sensor S and programs stored in advance.

In the control board 20, as shown in FIG. 3, the ends of fixing bolts 23 inserted through through-holes formed in the vicinity of four corners of the board body 21 are inserted into the screw holes of the board supports 44*a*, whereby the control board 20 is mounted to the side of the partitioning portion 44 facing the second reception chamber 42. Accordingly, as shown in FIG. 2, the sensor board 30 is mounted to the face of the partitioning portion 44 facing the second reception chamber 42 and the control board 20 is received in the second reception chamber 42 in a layered structure.

An electrical connection structure electrically connecting the electronic circuit of the control board 20 to the electrical components and the electrically-driven components mounted on the base body 100 will be described below.

First, in the second peripheral wall portion 42*a* of the housing 40, stepped portions 44*b* and 44*b* are formed inside two sides of the top and bottom sides in FIG. 3. The stepped portions 44*b* are formed on two sides of the top and bottom sides of the partitioning portion 44 and have a terminal mounting face 44*c* disposed on the front side closer to the front than the face facing the second reception chamber 42 as shown in FIG. 2. The terminal mounting faces 44*c* of the stepped portions 44*b* are adjacent to two sides of the top and bottom sides of the control board 20 mounted on the partitioning portion 44 and a terminal integrating portion 80 in which plural bus bars 81 are disposed is formed in each terminal mounting face (see FIG. 3).

In the electrical connection structure according to this embodiment, bus bars 81 of the terminal integrating portion 80 are electrically connected to electrical connection pads 24 (see FIGS. 4A and 4B) which are conductive members disposed in the electronic circuit (not shown) of the control board 20 by the use of bonding wires 82, whereby the electronic circuit of the control board 20 is electrically connected to the electromagnetic coil V1, the pressure sensor S, and the motor 200.

Figure 4A:
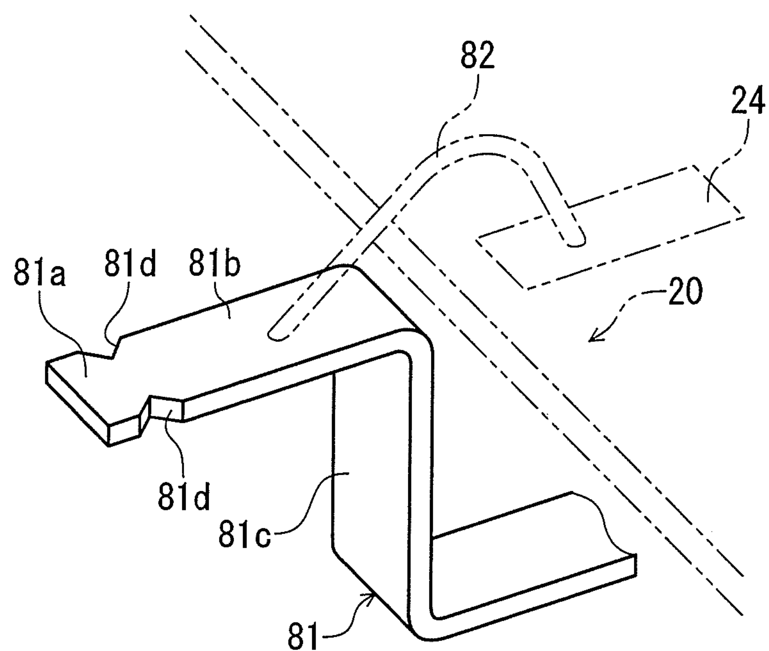
Figure 4B:
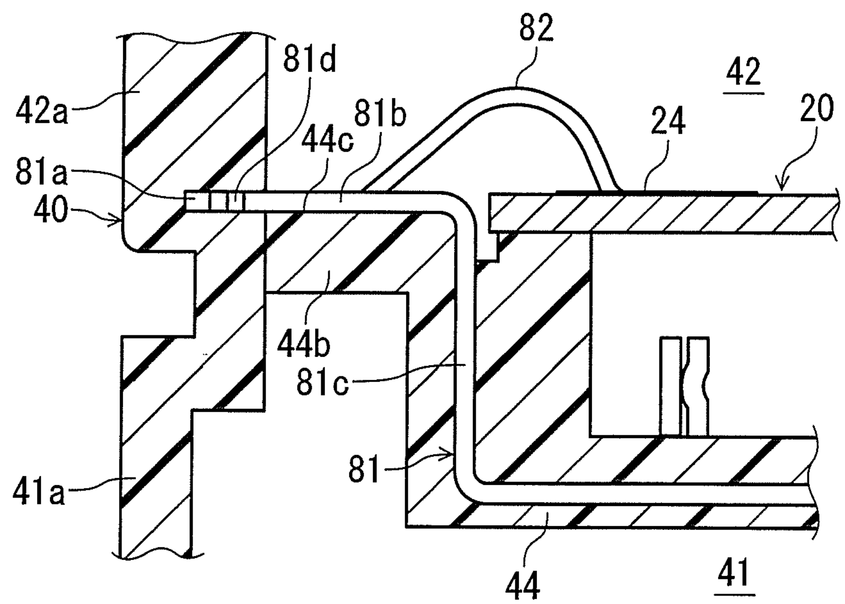

As shown in FIG. 4B, the bus bar 81 is a plate-like member formed of metal (copper) bent along the inner shape of the second peripheral wall portion 42*a* of the housing (see FIG. 4A). The bus bar 81 includes an embedded portion 81*a* embedded in the second peripheral wall portion 42*a* of the housing 40, an exposed portion 81*b* exposed from the terminal mounting face 44*c* of the stepped portion 44*b* of the second peripheral portion 42*a*, and a connecting portion 81*c* extending from the exposed portion 81*b* and being embedded in the partitioning portion 44.

The exposed portion 81*b* is a portion located between the embedded portion 81*a* and the connecting portion 81*c* and is exposed to the second reception chamber 42 on the terminal mounting face 44*c* of the stepped portion 44*b* of the second peripheral wall portion 42*a*. The exposed portion 81*b* extends from the inner face of the second peripheral portion 42*a* to the electrical connection pad 24 of the control board 20 and is bent to the back side just before of the control board 20. In the state where the control board 20 is mounted to the partitioning portion 44, the exposed portions 81*b* are disposed at the position adjacent to two sides of the top and bottom sides of the control board 20, and the front face of the exposed portion 81*b* is substantially flush with the front face of the control board 20. An end of a bonding wire 82 is welded to the front face (the upper face in FIG. 4B) of the exposed portion 81*b*.

In the longitudinal direction (the lateral direction in FIG. 4B) of the exposed portion 81*b*, the connecting portion 81*c* extends into the second reception chamber 42. The connecting portion 81*c* extends from the exposed portion 81*b* into the partitioning portion 44 and is a portion electrically connected to the terminal of the electromagnetic coil V1, the terminal of the pressures sensor S, and the motor bus bar 220 of the motor 200 (see FIG. 2).

In the longitudinal direction of the exposed portion 81*b*, the embedded portion 81*a* extends to the second peripheral wall portion 42*a*. The embedded portion 81*a* is a portion embedded in the second peripheral wall portion 42*a* at the time of insert-molding the bus bar 81 into the housing 40.

As shown in FIG. 4A, cut portions 81*d* and 81*d* are formed in both side edges (both edges in the width direction) of the embedded portion 81*a*. Both cut portions 81*d* and 81*d* are formed at positions opposed to each other in the width direction of the bus bar 81. Each cut portion 81*d* has a triangular shape indented in the direction perpendicular to the longitudinal direction f the embedded portion 81*a* and the exposed portion 81*b* and is formed by punching the side edges of the embedded portion 81*a* by the use of press molding.

When the bus bar 81 is insert-molded into the housing 40, synthetic resin flows in the cut portions 81*d* and 81*d* and the synthetic resin is cured in the cut portions 81*d* and 81*d*.

As shown in FIGS. 4A and 4B, the bus bar 81 is electrically connected to the electrical connection pad 24 disposed in the electronic circuit (not shown) of the control board 20 by a bonding wire 82. The bonding wire is a metal (aluminum) wire, an end thereof is vibration-welded to the front face (the upper face in FIG. 4B) of the exposed portion 81*b* of the bus bar 81, and the other end thereof is vibration-welded to the front face of the electrical connection pad 24.

In the second peripheral wall portion 42*a* of the housing 40, the terminal integrating portion 90 in which plural bus bars 91 are disposed is formed inside the right side in FIG. 3. An end of each bus bar 91 of the terminal integrating portion 90 is exposed into the second reception chamber 42 and the other end thereof is connected to a terminal of a connector joint (not shown) disposed on the back side of the housing 40 through the second peripheral wall portion 42*a*. The connector joint is a portion to which a connector disposed at an end of an external cable is connected.

The bus bars 91 of the terminal integrating portion 90 are electrically connected to the electrical connection pads 25 disposed in the electronic circuit of the control board 20 by the bonding wires 92, whereby the electronic circuit of the control board 20 is electrically connected to the connector joint.

In this electrical connection structure, as shown in FIGS. 4A and 4B, the cut portions 81*d* and 81*d* can be easily formed by punching both side edges of each bus bar 81 by the use of the press molding. At the time of insert-molding the bus bars 81 into the housing 40, the synthetic resin flows in the cut portions 81*d* and 81*d* formed in the embedded portions 81*a* of the bus bars 81 and the synthetic resins cured in the cut portions 81*d* and 81*d* serves as a wedge. Accordingly, in the electrical connection structure according to this embodiment, it is possible to easily enhance the adhesive property of the bus bar 81 to the housing 40 and thus to enhance the connection reliability between the control board 20 and the bus bar 81.

At the time of vibration-welding an end of the bonding wire 82 to the front face of the exposed portion 81*b*, the end of the bonding wire 82 is made to ultrasonically-vibrate in the longitudinal direction of the exposed portion 81*b* on the front face of the exposed portion 81*b*, whereby the end of the bonding wire 82 is welded to the front face of the exposed portion 81*b*. Accordingly, when the bonding wire 82 is bonded to the bus bar 81, the vibration acts in the longitudinal direction of the embedded portion 81*a* and the exposed portion 81*b*.

Therefore, in this embodiment, the cut portions 81*d* and 81*d* are formed by indenting the exposed portion 81*b* in the direction perpendicular to the longitudinal direction of the exposed portion. Accordingly, the adhesive property of the bus bar 81 in the longitudinal direction of the exposed portion 81*b*, that is, in the vibrating direction at the time of vibration-welding the bonding wire 82 to the exposed portion 81*b* is enhanced. As a result, when the bonding wire 82 is vibration-welded to the bus bar 81, it is possible to prevent the adhesive force of the bus bar 81 to the housing 40 from being reduced.

By embedding the end of the bus bar 81 in the housing 40, the bus bar 81 can be accurately positioned with respect to the housing 40. Accordingly, as shown in FIG. 3, it is possible to reduce the gap between the plural bus bars 81 arranged in parallel. Therefore, it is possible to reduce the space of the terminal integrating portion 80, thereby reducing the size of the housing 40.

While the embodiment of the invention has been described, the invention is not limited to the embodiment but can be properly modified without departing from the concept of the invention.

For example, in the embodiment, the cut portions 81*d* and 81*d* are formed in both side edges of the embedded portion 81*a* of the bus bar 81 as shown in FIG. 4A. However, the cut portion 81*d* may be formed on only one side edge of the embedded portion 81*a*.

Figure 5A:
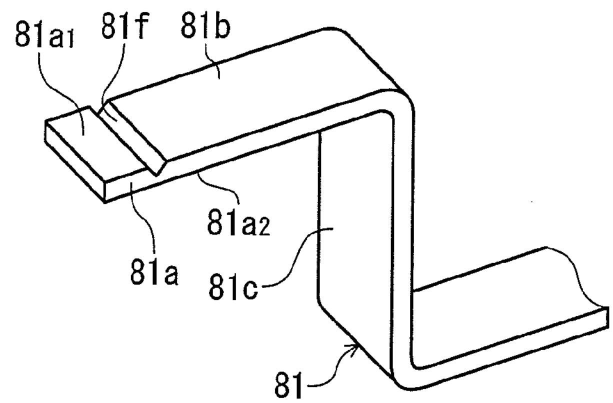

As shown in FIG. 5A, a cut portion 81*f* may be formed in the front face 81$a_1$ of the embedded portion 81*a* of the bus bar 81 by the use of the press molding. In this configuration, the cut portion 81*f* extends in the width direction of the bus bar 81, that is, in the direction perpendicular to the longitudinal direction of the exposed portion 81*b*, and thus the synthetic resin is filled in the overall width of the bus bar 81. Accordingly, it is possible to enhance the adhesive property of the bus bar 81 in the vibration direction at the time of vibration-welding the bonding wire to the exposed portion 81*b*. The cut portion 81*f* may be formed in the back face 81$a_2$ of the embedded portion 81*a*.

Figure 5B:
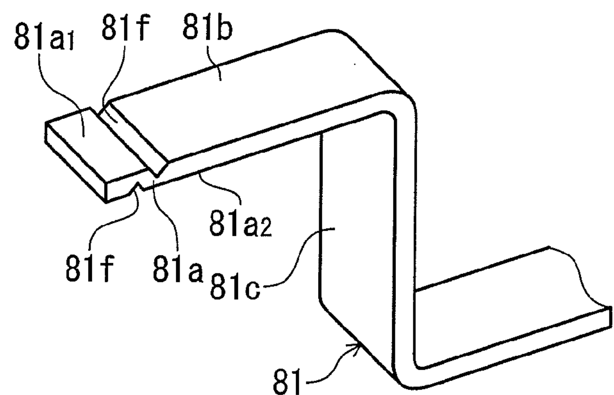
Figure 5C:
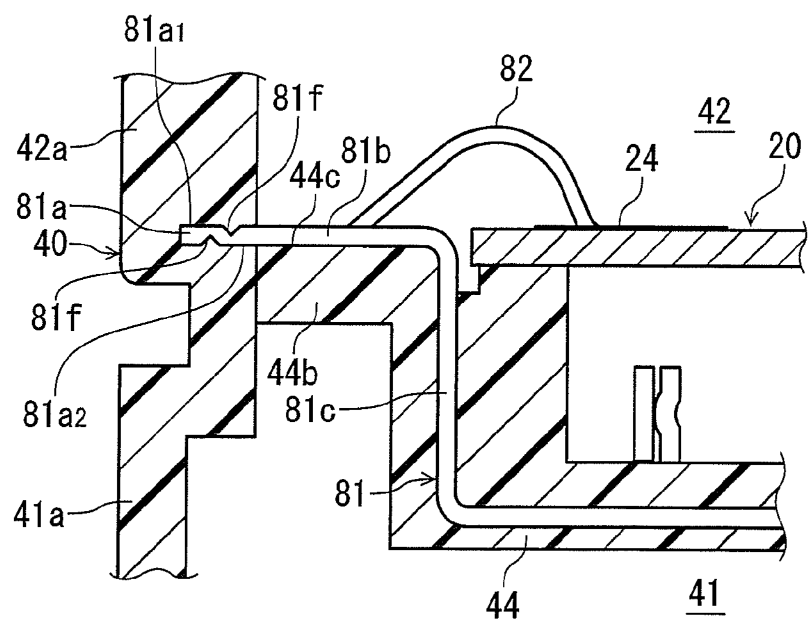

As shown in FIGS. 5B and 5C, the cut portions 81*f* and 81*f* may be formed in both the front face 81$a_1$ and the back face 81$a_2$ of the embedded portion 81*a* of the bus bar 81. In this case, when the synthetic resin filled in the cut portions 81*f* and 81*f* of both faces, the movement of the embedded portion 81*a* in the longitudinal direction is regulated. Accordingly, it is possible to easily enhance the adhesive property of the bus bar 81 to the housing 40. In this configuration, by forming the cut portions 81*f* and 81*f* to depart from each other in the longitudinal direction of the embedded portion 81*a*, the cut portions can be formed in both faces of the thin-plate-shaped embedded portion 81*a*.

Figure 6A:
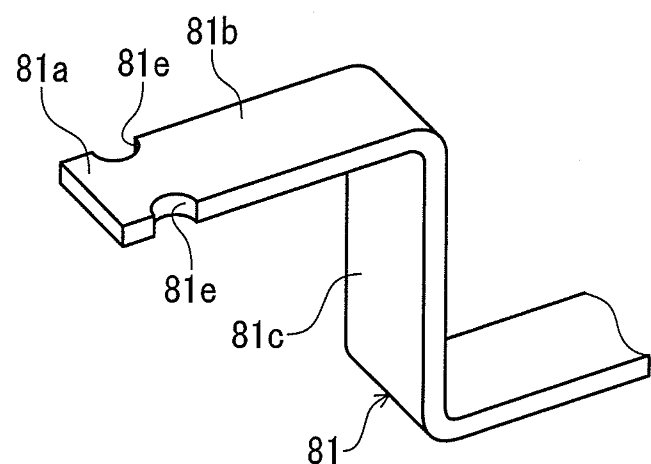
Figure 6B:
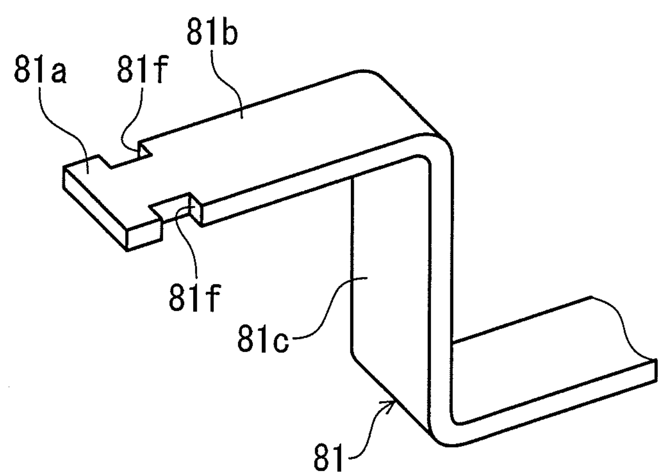

The shape or the number of cut portions 81*d* and 81*f* is not limited. For example, cut portions 81*e* having a semi-circular shape may be formed as shown in FIG. 6A or cut portions 81*f* having a rectangular shape may be formed as shown in FIG. 6B.

Although the electrical connection structure of the control board 20 in the brake fluid pressure control device for a vehicle U is exemplified in this embodiment as shown in FIG. 1, the configuration of the electronic board or the configuration of the board support member to which the electronic board is fixed is not limited.

What is claimed is:

1. An electrical connection structure of an electronic board comprising:

a board support member formed of synthetic resin;

an electronic board fixed to the board support member;

an electrical connection pad disposed on the electronic board;

a bus bar disposed in the board support member; and a bonding wire that electrically connects the electrical connection pad and the bus bar, wherein the bus bar comprises:

an exposed portion exposed in a face of the board support member;

an embedded portion having an end portion embedded in a peripheral wall portion of the board support member; and a connection portion extending from the exposed portion and being electrically connected to an electrical component, the connection portion being closer to the electronic board than the embedded portion and being disposed below the electronic board, wherein an end of the bonding wire is bonded to the exposed portion, and wherein a first cut portion is formed in the embedded portion.

2. The electrical connection structure of claim 1, wherein the board support member comprises a mounting portion to which the electronic board is mounted and the peripheral wall portion surrounding the mounting portion.

3. The electrical connection structure of claim 1, wherein the embedded portion is formed at the end portion of the bus bar.

4. The electrical connection structure of claim 1, wherein the first cut portion is formed in at least one of a front face and a back face of the embedded portion.

5. An electrical connection structure of an electronic board comprising:

a board support member formed of synthetic resin;

an electronic board fixed to the board support member;

an electrical connection pad disposed on the electronic board;

a bus bar disposed in the board support member; and a bonding wire that electrically connects the electrical connection pad and the bus bar, wherein the bus bar comprises:

an exposed portion exposed in a face of the board support member;

an embedded portion embedded in a peripheral wall portion of the board support member; and a connection portion extending from the exposed portion and being electrically connected to an electrical component, the connection portion being closer to the electronic board than the embedded portion and being disposed below the electronic board, wherein an end of the bonding wire is bonded to the exposed portion, wherein a first cut portion is formed in the embedded portion, wherein the first cut portion is formed in a first position on a front side of the embedded portion, wherein a second cut portion is formed in a second position on a back side of the embedded portion, and wherein the first position is shifted from the second position in a longitudinal direction of the embedded portion.

6. The electrical connection structure of claim 1, wherein a plurality of the bus bars are formed in parallel in the board support member.

7. The electrical connection structure of claim 3, wherein the first cut portion is formed in a side edge portion of the embedded portion and is indented in a direction perpendicular to a longitudinal direction of the exposed portion.

8. The electrical connection structure of claim 1, wherein the electrical connection pad is disposed on one side of the electronic board, and at least a part of the connection portion extends on the other side of the electronic board.

9. The electrical connection structure of claim 1, wherein the peripheral wall portion of the board support member includes stepped portions, and the bus bar is bent along an inner shape of the peripheral wall portion.

10. The electrical connection structure of claim 7, wherein at least a part of the exposed portion is disposed directly on one of the stepped portions of the peripheral wall portion.

11. The electrical connection structure of claim 1, wherein the exposed portion extends from an inner face of the peripheral wall portion toward the electrical connection pad and is bent before the control board.

12. The electrical connection structure of claim 1, wherein the electrical component to which the connection portion of the bus bar is connected is one of an electromagnetic coil, a pressure sensor and a motor.

13. The electrical connection structure of claim 1, wherein a second cut portion is formed in the embedded portion, and the first cut portion and the second cut portion are formed in both side edges of the embedded portion.

14. The electrical connection structure of claim 13, wherein the first cut portion and the second cut portion are formed at positions opposed to each other in a width direction of the bus bar.

15. The electrical connection structure of claim 14, wherein the first cut portion and the second cut portion are triangular shape indented in a direction perpendicular to a longitudinal direction of the embedded portion.

16. The electrical connection structure of claim 14, wherein the first cut portion and the second cut portion are a semi-circular shape or a rectangular shape.

17. The electrical connection structure of claim 13, wherein the first cut portion and the second cut portion are embedded in the peripheral wall portion of the board support member formed of the synthetic resin.

18. The electrical connection structure of claim 1, wherein the first cut portion extends in a width direction of the bus bar, perpendicular to a longitudinal direction of the exposed portion.

* * * * *